Patented June 19, 1951

2,557,633

UNITED STATES PATENT OFFICE 2,557,633

ACETYLSULFANILYL-S-ALKYL ISOTHIOUREAS

Edward H. Cox, Swarthmore, and James M. Sprague, Drexel Hill, Pa., assignors to Sharp & Dohme, Incorporated, Philadelphia, Pa., a corporation of Maryland No Drawing. Original application January 13, 1942, Serial No. 426,564. Divided and this application November 18, 1947, Serial No. 786,782

2 Claims. (Cl. 260—397.7)

This invention relates to arylsulfonyl-S-substituted-isothioureas and their preparation, and more particularly to the class of compounds represented by the following general formulae:

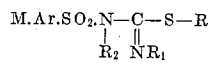

and

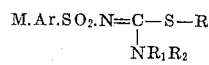

in which M may be para or ortho to the sulfonyl group and may be hydrogen, a halogen radical as chlorine or bromine, or a nitro, amino, or alkyl-, acyl-, acylalkyl-amino group (and the alkyl, acyl or acylalkyl group thereof may be saturated or unsaturated such as methyl, ethyl, butyl, allyl, hexyl and the like, straight or branched chain, such as isoamyl, or substituted as 2-chloropropyl or non-substituted); Ar is an aryl radical such as the phenyl or substituted phenyl, or naphthyl or substituted naphthyl and the like; and R, $R_1$ and $R_2$ may be separately hydrogen, an alkyl group of the type as noted above for the alkyl radical in the substituted amino group of M and having even up to eighteen or more carbon atoms, an aryl radical, non-substituted as phenyl or naphthyl and the like or substituted as chloro-phenyl, tolyl, xylyl and the like, or aralkyl as benzyl and the like.

The compounds of the invention are useful as chemotherapeutic agents and as intermediates in the preparation of other compounds.

The compounds of the invention are not restricted to any single method of preparation although part of the invention is the preparation of these compounds by condensing any selected S-substituted isothiourea compound having a replaceable hydrogen attached to nitrogen (using the S-substituted-isothiourea either as the free base or as a salt thereof) with a suitable arylsulfonyl halide having no unsubstituted amino group attached to the aryl nucleus. To obtain the arylsulfonyl-S-substituted-isothiourea having an unsubstituted amino group linked to the aryl nucleus, first there is prepared, for example, by the method just given, the corresponding arylsulfonyl-S-substituted-isothiourea having linked to the aryl nucleus a group convertible to an amino group, such as an acylamino group which is readily convertible to an amino group by hydrolysis, or a nitro or diazo group which is convertible to an amino group by reduction, which arylsulfonyl-S-substituted-isothiourea is then hydrolyzed or reduced, as the case may require, to the desired aminoarylsulfonyl-S-substituted-isothiourea.

In the reaction between the S-substituted-isothiourea compound and the arylsulfonyl halide, a hydrogen halide is liberated. Therefore, to improve the yield, it is desirable to provide a basic substance, such as sodium hydroxide, sodium bicarbonate, potassium carbonate or pyridine or other alkaline acting substance, to unite with the hydrogen halide liberated in the reaction. The reaction with the described agents may be carried out in a suitable medium such as water, acetone and the like.

The desired S-alkyl-isothiourea may be prepared by reacting the required thiourea, having the general formula

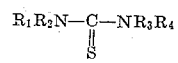

in which any two of the R's are hydrogen and the other two R's are separately hydrogen or an alkyl, aralkyl or aryl group of the type as hereinabove described for $R_1$ and $R_2$, with an alkylating agent, for example, an alkyl or aralkyl halide, as methyl iodide or bromide or ethyl chloride or bromide or benzyl chloride, or an alkyl sulfate as diethyl sulfate, or an alkyl sulfonate, and the like, whereby one of the replaceable hydrogens represented by one of the R's is replaced by the selected alkyl or aralkyl radical to yield the desired S-alkyl-isothiourea salt from which the desired S-alkyl-isothiourea may be obtained in known manner.

The invention may be illustrated by, but not restricted to, the following examples:

*Example 1.—Benzenesulfonyl-S-ethylisothiourea.*—37.0 g. of S-ethylisothioureahydrobromide was dissolved in water and 35.3 g. of benzenesulfonyl chloride added. The mixture was vigorously agitated and a solution of 10% sodium hydroxide added at such a rate that the reaction mixture was kept slightly alkaline. When the reaction was complete, as shown by a permanently alkaline reaction, the solid desired end-product was removed by filtration, and recrystallized from dilute alcohol or from a mixture of benzene and petroleum ether, its m. pt. was 109–110° C.

Similarly, by condensing an S-alkyl isothiourea compound as S-methylisothiourea hydrobromide separately with any selected non-substituted arylsulfonyl halide as the non-substituted phenylsulfonyl halide, benzene sulfonyl chloride, or a substituted arylsulfonyl halide as the mono- or poly-, such as di-alkyl-substituted-phenyl-sulfonyl halides as p-toluenesulfonyl chloride, 3,4-dimethylphenyl-sulfonyl chloride, 2,4-dimethylphenyl-sulfonyl chloride and 2,5-dimethylphenyl-sulfonyl chloride, there are obtained respectively the following arylsulfonyl methyl-iso-thioureas having the corresponding melting points (in °C.) shown:

| | |
|---|---|
| Benzenesulfonyl-S-methylisothiourea | 159–160 |
| p-Toluenesulfonyl-S-methylisothiourea | 118–119 |
| 3,4-dimethylphenylsulfonyl-S-methyl-isothiourea | 136–137 |
| 2,4-dimethylphenylsulfonyl-S-methyl-isothiourea | 137–138 |
| 2,5-dimethylphenylsulfonyl-S-methyl-isothiourea | 144–145 |

*Example 2.—p-acetylaminobenzenesulfonyl-S-methyl-isothiourea.*—In a three liter flask provided with a motor stirrer was placed 400 g. of anhydrous potassium carbonate and one liter of acetone to which had been added 300 cc. water. The suspension was stirred and cooled in an ice bath. To this was added a mixture of 153 g. (1.1 moles) of S-methyl-iso-thiourea sulfate and 234 g. (1.0 mole) of p-acetylaminobenzenesulfonyl chloride over a period of half an hour. After the addition, the ice bath was removed and the reaction mixture stirred for four hours. The reaction contents were then poured while stirring into four liters of water, filtered, and washed with water. When dried, the crude product weighed 228 g. (yield 80%). After crystallization from dilute alcohol, small colorless needles of p-acetylaminobenzenesulfonyl-S-methyl-isothiourea were deposited which melted at 230–232° C.

*Example 3.—p-Aminobenzenesulfonyl-S-methyl-isothiourea.*—Two hundred grams of p-acetylaminobenzenesulfonyl-S-methyl-isothiourea (product of Example 2) was suspended in 1200 cc. of 7% hydrochloric acid solution. The flask was lowered into a boiling water bath and mechanically stirred until solution took place (30–45 mins.). The solution was then treated with half volume of water (to prevent the crystallization of the hydrochloride salt). It was then cooled in an ice bath and made alkaline with ammonia (with stirring). The crude product was filtered, washed, and dried (128 g., 75% yield), and after being twice crystallized from dilute acetic acid, it melted at 183–185° C. (colorless white needles).

*Example 4.—p-Acetylaminobenzenesulfonyl-S-ethylisothiourea.*—A solution of 55.5 g. of S-ethylisothiourea hydrobromide in 100 cc. of water and a solution of 70.0 g. of p-acetylaminobenzenesulfonyl chloride in 350 cc. of acetone were mixed and a solution of 15.0 g. of sodium hydroxide in 150 cc. of water added slowly from a dropping funnel. The reaction mixture was vigorously stirred and the internal temperature maintained at 10–15° C. during the addition of the alkali. When the reaction mixture remained permanently alkaline, the product was removed by filtration and recrystallized from dilute alcohol, m. pt. 181.5–182° C.

*Example 5.—p-Aminobenzenesulfonyl-S-ethyl-isothiourea.*—The acetylaminobenzenesulfonyl-S-ethylisothiourea was suspended in 1:7 hydrochloric acid (12 cc. per gram) and ethyl alcohol added (1 cc. per gram). This mixture was heated, with stirring, on a water bath until all the solid had dissolved. The solution was cooled and neutralized with sodium bicarbonate. The precipitated product was separated and recrystallized from alcohol, m. pt. 160–161.5° C.

*Example 6.—p-Acetylaminobenzenesulfonyl-S-n-hexylisothiourea.*—This was prepared from p-acetylaminobenzenesulfonyl chloride and S-n-hexylisothiourea·HBr in manner similar to that described in Example 4, m. pt. 125.5–126° C.

*Example 7.—p-Aminobenzenesulfonyl-S-n-hexylisothiourea.*—The product from Example 6 was hydrolyzed with dilute hydrochloric acid as described in Example 5 for the ethyl derivative and recrystallized from dilute alcohol, m. pt. 129–130.5° C.

By replacing the benzenesulfonyl chloride of Example 1 by an equimolecular quantity of any other desired arylsulfonyl halide, such as p- or o-nitrobenzenesulfonyl chloride, or p- or o-acetylethylaminobenzenesulfonyl chloride, there is obtained respectively the corresponding p- or o-nitrobenzenesulfonyl-S-ethyl-isothiourea, the p- or o-acetylethylaminobenzenesulfonyl-S-ethyl isothiourea, or the p- or o-ethylaminobenzenesulfonyl-S-ethyl-isothiourea.

Also, by replacing the p-acetylaminobenzenesulfonyl chloride of Example 2 by an equimolecular quantity of any other p- or o-acylaminobenzenesulfonyl halide, there is obtained the corresponding p- or o-acylaminobenzenesulfonyl-S-methylisothiourea.

Further, by replacing the S-alkyl-isothiourea of any of the Examples 1, 2, 4 and 6 by any other S-alkyl-isothiourea, or by any S-aralkyl-isothiourea, as S-benzyl-isothiourea, or any S-aryl-isothiourea as S-phenyl-isothiourea, there are obtained respectively the corresponding arylsulfonyl-S-alkyl-isothioureas, or arylsulfonyl-S-aralkyl-isothioureas, and arylsulfonyl-S-arylisothioureas.

Thus, while variations in the starting materials employed for preparing the products of the invention, as hereinabove indicated, give the various types and classes of products and the various specific products particularly mentioned hereinabove, the invention also includes products such as p- or o-aminobenzenesulfonyl-S-ethyl-N-methyl-isothiourea or other corresponding compounds in which the N-methyl group in the product last described is replaced by any other alkyl, or by an aralkyl or aryl group, or the corresponding compounds in which the amino group ortho or para to the sulfonyl radical is replaced by a substituted-amino group or a nitro group or hydrogen.

Of those compounds of the invention in which a nitro or an amino (whether substituted or unsubstituted) group is linked to the aryl radical represented by Ar in the general formula, those in which such nitro or amino group is para in position to the sulfonyl group are the more chemotherapeutically active.

This application is a division carved out of our copending application Serial No. 426,564, filed January 13, 1942, now U. S. Patent No. 2,441,566, issued May 18, 1948.

We claim:

1. An N-benzenesulfonyl-S-alkylisothiourea having the general formula:

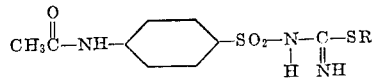

in which R is a lower alkyl radical.

2. The compound p-acetylaminobenzenesulfonyl-S-n-hexylisothiourea.

EDWARD H. COX.
JAMES M. SPRAGUE.

(References on following page)

REFERENCES CITED

The following references are of record in the file of this patent:

UNITED STATES PATENTS

| Number | Name | Date |
|---|---|---|
| 2,312,404 | Haack | Mar. 2, 1943 |
| 2,332,906 | Foldi et al. | Oct. 26, 1943 |
| 2,416,995 | Hartmann et al. | Mar. 4, 1947 |
| 2,441,566 | Cox et al. | May 18, 1948 |

FOREIGN PATENTS

| Number | Country | Date |
|---|---|---|
| 874,629 | France | May 18, 1942 |

OTHER REFERENCES

Basterfield et al.: J. Am. Chem. Soc., vol. 49 (1927), pp. 3177–3180.

Cox and Raymond; J. Am. Chem. Soc., vol. 63, pp. 300 and 301, (Jan. 9, 1941).

Chemical Abstracts, vol. 36 (1942), page 5199 (abstract of Mayer, Rev. Medicale France, Nov.-Dec., 1941, pp. 3 to 19).